Patented Jan. 25, 1949

2,459,949

UNITED STATES PATENT OFFICE 2,459,949

PROCESS FOR THE PREPARATION OF HYDROXY - HYDROPHENANTHRENE CARBOXYLIC ACIDS AND ESTERS

Karl Miescher, Riehen, and Georg Anner, Basel, Switzerland, assignors to Ciba Pharmaceutical Products Inc., Summit, N. J., a corporation of New Jersey No Drawing. Application October 12, 1945, Serial No. 622,092. In Switzerland November 30, 1944

6 Claims. (Cl. 260—473)

In copending application, Serial No. 542,812, filed June 29, 1944, there is described a process for the manufacture of hydroxyhydrophenanthrene carboxylic acids or derivatives thereof consisting in causing 1-ketohydrophenanthrenes which contain in the 2-position, in addition to a hydrocarbon radical, a functionally converted carboxyl group and in the 7-position a free phenolic hydroxyl group or a substituent convertible into such a group, to react with an organo-metallic compound for the purpose of introducing a hydrocarbon radical into the 1-position, then directly or indirectly eliminating the newly formed tertiary hydroxyl group, and, if desired, converting the functionally converted carboxyl group in 2-position into a free carboxyl group and/or the substituent in 7-position into a free hydroxyl group, and hydrogenating non-aromatic multiple carbon linkages at any desired stage after the reaction with the organo-metallic compound.

This process is relatively circumstantial, especially when considering the fact that the manufacture of the necessary starting materials is cumbersome and requires many steps. Thus, a seven-step synthesis is necessary only for obtaining the parent materials, starting from 1-[β-halogen-ethyl]-6-methoxy-naphthalene [cf. W. E. Bachman, Journ. Am. Soc. vol. 61, page 974 (1939) and vol. 62, page 824 (1940)].

According to the present invention the same final products are obtained in an essentially shorter way by treating naphthalene derivatives containing in 6-position a group convertible into a phenolic hydroxyl, in 2-position a hydrogen atom capable of condensation, and in 1-position the group

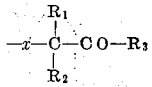

wherein $x$ represents an alkylene bridge, $R_1$ represents hydrogen or a hydrocarbon radical, $R_2$ represents a functionally converted carboxyl group and $R_3$ represents a substituted or unsubstituted hydrocarbon radical, with agents which effect ring closure either directly or indirectly, if necessary eliminating a produced tertiary hydroxyl group directly or by the way of intermediate products, and, if desired, causing hydrogenating agents and/or such agents to react with the resulting product which convert the group convertible into a phenolic hydroxyl or the functionally converted carboxyl group into a free hydroxyl group or a carboxyl group, respectively.

The present process is relatively simple and has moreover the advantage that the necessary starting materials are easily producible. Thus they can be obtained, for example, by starting from 1-[β-halogen-ethyl]-naphthalenes having in 6-position a group convertible into a phenolic hydroxyl, by reaction with aliphatic β-ketocarboxylic acids whose carboxyl group is functionally converted and which contain in α-position at least one hydrogen atom. The substituent standing in 6-position may be, for example, a hydroxyl group etherified by methanol, ethanol, phenols, benzylalcohols or the like, or a hydroxyl group esterified by organic or inorganic acids, a nitro- or amino group or a halogen atom. The starting materials may be partially hydrogenated in the nucleus and contain further substituents in the nucleus itself as well as in the side chain. Starting materials wherein $R_1$ represents a hydrocarbon radical can be obtained directly by using the correspondingly substituted β-ketocarboxylic acid derivatives. However, when preparing at first compounds wherein $R_1$ stands for hydrogen, the hydrocarbon radical can also subsequently be introduced in known manner.

For the purpose of comparison there is shown below the known and the new way for synthesizing the 7-methoxy-1-ethyl-1-hydroxy-2-methyl-2 - carbomethoxy - 1:2:3:4 - tetrahydrophenanthrene and the 7-methoxy-1-ethylidene-2-methyl - 2 - carbomethoxy - 1:2:3:4 - tetrahydrophenanthrene respectively, starting from 6-methoxy-1-[β-bromoethyl]-naphthalene:

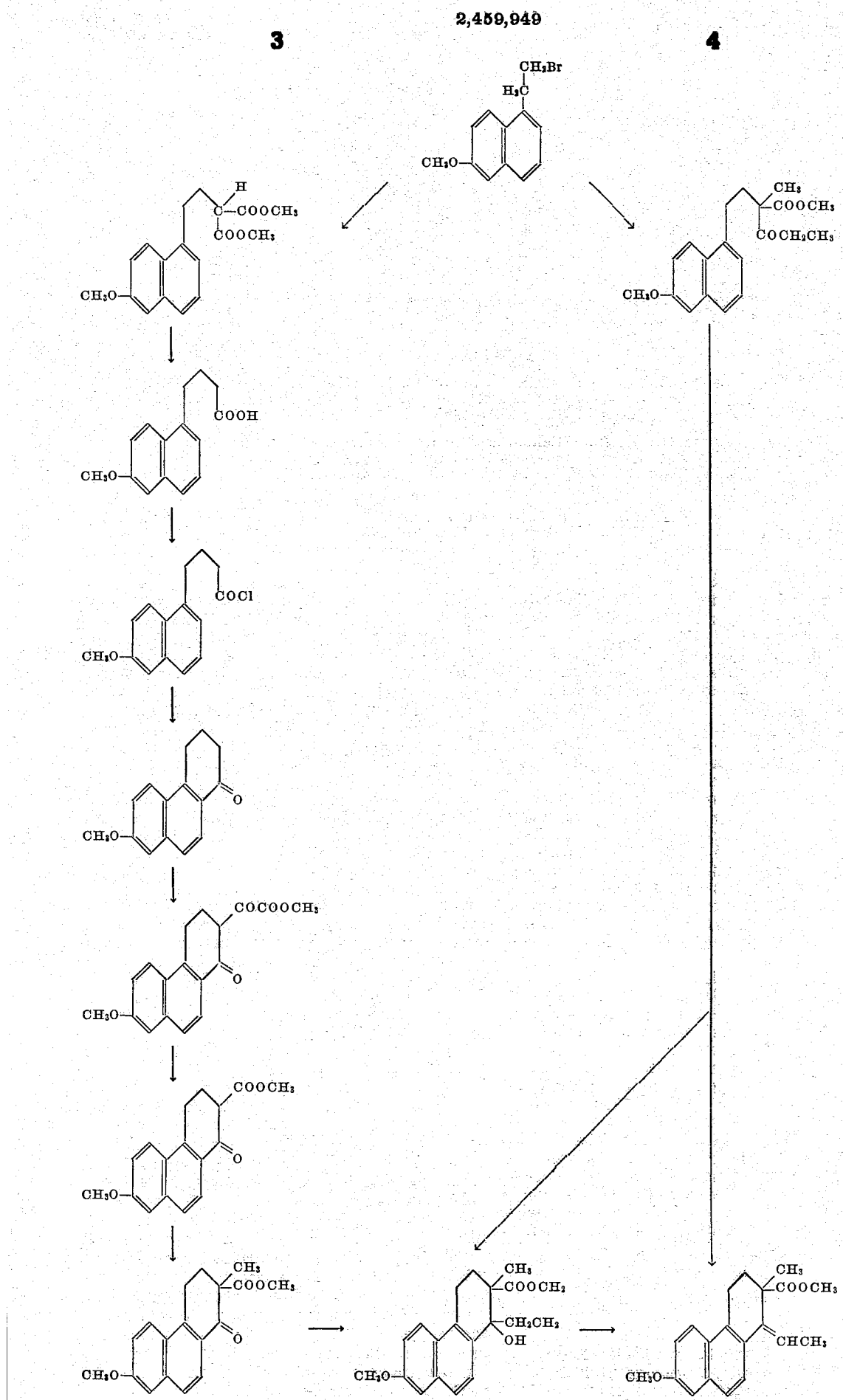

According to the present process these starting materials are treated with agents bringing about ring closure either directly or indirectly.

In the case of direct ring closure, depending on the condensing agents and/or the conditions of reaction, water is eliminated or tertiary carbinol compounds are formed at first. The newly formed tertiary hydroxyl group may be removed directly or by way of intermediate products. This may happen, for example, with formation of a carbon double bond. To this end water is eliminated directly, or the hydroxyl group is first replaced by a halogen, or another ester or ether radical. Subsequently a hydroxyl changed in this way may be eliminated by thermic decomposition or by treatment with agents which eliminate acid or alcohol. The removal of the tertiary hydroxyl group or of the halogen atom can also be undertaken by reduction, e. g. with the help of hydrogen in the presence of a precious metal catalyst, or also with hydriodic acid in the presence of glacial acetic acid. The double bonds formed by direct ring closure may be saturated with hydrogen.

If ring closure has to take place indirectly, the keto group is at first converted into a secondary or tertiary carbinol group, either directly with the aid of reducing agents or by reaction with organo-metallic compounds, such as alkyl, alkenyl or alkinyl-magnesium-halides, alkinyl-alkali compounds and the like, and water is then eliminated. Here, too, the ring closure can be effected directly or by way of intermediate products.

As condensing agents there can be used, inter alia, more or less concentrated sulfuric acid, phosphoric acid, phosphorus oxy chloride, phosphorus pentoxide or mixtures thereof as such or in the presence of suitable solvents, such as glacial acetic acid or benzene. Simultaneously with the ring closure a saponification of groups capable of being hydrolyzed may take place. This is the case, for example, if the condensing agent used is aqueous and if, for example, secondarily bound carbalkoxy groups are present in the starting material which groups, as is known, can often be better saponified to free carboxylic groups than tertiarily bound carbalkoxy groups.

Any groups convertible into phenolic hydroxyl groups still present as well as functionally converted carboxylic acid groups, for example, nitrile- or carbalkoxy groups, are converted, if necessary, into free hydroxyl or carboxyl groups. For this there are used hydrolyzing agents, particularly in the presence of esters and ethers, further aluminum halides, pyridine salts and the like. In case that benzyl groups or the like are split off, also reducing agents may be used.

The hydroxy-hydrophenanthrene carboxylic acids or their derivatives thus obtained may also be converted into their carboxylic acid esters and/or phenol esters or phenol ethers. Furthermore, free carboxylic acids may be converted into carboxylic acid salts.

The new compounds find application in therapeutics or as intermediate products for the preparation of therapeutic substances.

The following examples illustrate the invention without in any way limiting its scope, the parts being by weight:

*Example 1*

5 parts of 5 - (6' - methoxy - naphthyl-1') - 3-methyl-3-carbomethoxy-pentane - 2 - one of the formula

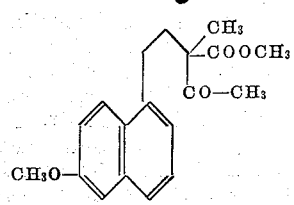

are treated for several hours with 25 parts of ortho-phosphoric acid, while stirring. After performed cyclisation the reaction mixture is poured into much water and the precipitated oily product is taken up in ether. The ethereal solution which has been washed until neutral and dried is evaporated and to the residue is added a little methyl alcohol. The 7-methoxy-1-methylene-2-carbomethoxy-2-methyl - 1:2:3:4 - tetrahydrophenanthrene of the formula

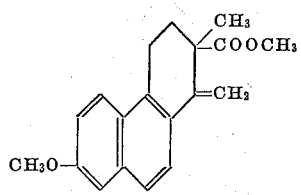

crystallizes out after some time. When recrystallized from isopropylether it melts at 98–100° C.

For the purpose of saponifying the carboxyl group 1 part of this compound is heated for a short time in the oil bath to 180° C. in a mixture of 3 parts of potassium hydroxide, 0.5 part of water and 0.5 part of methyl alcohol. The reaction mixture is then taken up in water, the solution is acidified and the 7-methoxy-1-methylene-2 -carboxy-2-methyl-1:2:3:4-tetrahydrophenanthrene is thus obtained. After recrystallization from acetone it melts at 177–178° C.

By hydrogenation in an aqueous alcoholic alkaline solution in the presence of a nickel catalyst it can be converted into the 7-methoxy-1:2-dimethyl-2-carboxy - 1:2:3:4-tetrahydrophenanthrene of melting point 226° C. This acid can be converted into the 7-hydroxy-1:2-dimethyl-2-carboxy - 1:2:3:4 - tetrahydrophenanthrene by boiling with a mixture of glacial acetic acid and hydrochloric acid. When recrystallized from dilute alcohol it melts at 244° C.

Instead of bringing about ring closure directly, one may at first reduce the starting material, for example, with catalytically activated or nascent hydrogen or an aluminum alcoholate or -phenolate in the presence of isopropyl alcohol, to the 5-(6'-methoxy - naphthyl-1')-3-methyl-3-carbomethoxy-pentane-2-ol, and then treat this compound with agents bringing about ring closure. The reduction of the keto group into a carbinol group can also be effected by reaction with a suitable organo-metallic compound, such as isopropyl magnesium bromide.

The starting material can be obtained, for example, in the following manner:

A mixture of 15 parts of potassium in 30 parts of methyl alcohol and 25 parts of benzene is mixed with 8.25 parts of acetoacetic acid methylester and heated until the solution is clear. 79.5 parts of 1-(β-bromo-ethyl)-6-methoxy- naphthalene are added to the cooled solution and heated for several hours under reflux. After cooling the mixture is acidified with glacial acetic acid, the solvents are evaporated and the acetoacetic ester in excess is removed in vacuo. The residue shows a positive color reaction with ferric chloride. For the purpose of methylation it is dissolved in 300 parts of benzene, the solution is boiled for a short time with sodium methoxide obtained from 7 parts of sodium, and, after cooling, 150 parts of methyliodide are allowed to drop thereto. When the reaction is complete the reaction mixture is heated for a further 2 hours under reflux, then poured into dilute acetic acid and taken up in ether. The 5-(6'-methoxy-naphthyl-1') - 3-methyl-3-carbomethoxy - pentane-2-one thus obtained can be distilled at 192–195° C. under 0.11 mm. pressure without being decomposed and does not show a colour reaction with ferric chloride.

*Example 2*

5 parts of 6-(6'-methoxy - naphthyl - 1')-4-methyl - 4 - carbomethoxy-hexane - 3-one of the formula

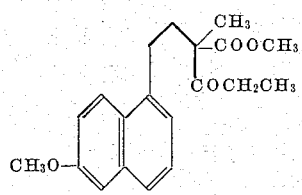

(obtained, for example, by reaction of 1-(β-iodoethyl)-6-methoxy-naphthalene with propionyl acetic acid methylester and subsequent methylation of the resulting product) are treated with a mixture of 9 parts of phosphoric acid of 100 percent strength and 9 parts of sulfuric acid of 95 percent strength. The whole is stirred until a homogeneous solution is formed and then allowed to stand for some hours. The red-brown colored reaction mixture is poured onto ice and the precipitated oil taken up in ether. The ethereal solution is washed until neutral, dried and evaporated. The residue is crystallized from isopropylether whereby the 7-methoxy-1-ethylidene-2-methyl - 2 - carbomethoxy-1:2:3:4-tetra hydrophenanthrene of melting point 98–116° C. is obtained.

1 part of this compound is dissolved in 10 parts of glacial acetic acid and hydrogenated with the aid of 0.1 part of palladium animal charcoal, the quantity of hydrogen calculated for 1 mol being taken up. The whole is filtered to remove the catalyst, the filtrate is evaporated and 7-methoxy - 1 - ethyl - 2 - carbomethoxy - 2 - methyl-1:2:3:4 - tetrahydrophenanthrene is thus obtained. By heating to 200° C. with an aqueous solution of potassium hydroxide this can be saponified to the 7-methoxy-1-ethyl-2-carboxy-2-methyl-1:2:3:4 - tetrahydrophenanthrene which melts at 225–228° C. after recrystallization from acetone. The methoxy group is split by heating to 170–180° C. with pyridine hydrochloride. The resulting 7-hydroxy-1-ethyl-2-carboxy-2-methyl-1:2:3:4-tetrahydrophenanthrene melts at 201–203° C. after recrystallization from dilute methyl alcohol. It can also be obtained by a single saponification of 7-methoxy-1-ethyl-2-carbomethoxy-2-methyl-1:2:3:4 - tetrahydrophenanthrene on heating with a methyl alcoholic solution of caustic potash in a closed tube.

Analogous final products are also obtained by starting from other 6-(6'-alkoxy-naphthyl-1')-4-alkyl-4-carbalkoxy-hexane - 3 - ones or from other 4-carboxylic acid derivatives, such as for example, from nitriles. Instead of derivatives of the acetoacetic acid ester or homologues thereof, there may also be used as starting materials, for example, derivatives of the β-keto-adipinic acid ester or naphthalene compounds partially hydrogenated in the ring carrying the side chain and containing in 2-position at least one hydrogen atom capable of condensation. Such starting materials can also be used whose naphthalene nucleus or ethylene bridge is further substituted by alkyl, halogen and the like.

For the ring condensation there can be used, instead of a mixture of phosphoric acid and sulphuric acid, for example, also phosphoric acid, sulfuric acid, phosphorus pentoxide or phosphorus oxy-chloride as such or in the presence of a suitable solvent, such as glacial acetic acid or benzene.

The hydroxy-carboxylic acids or their esters thus obtained can be converted into the corresponding phenolesters or phenol ethers, for example, into the propionates, butyrates, palmitates or benzoates or into the methoxy- or ethoxy compounds. Also water-soluble salts, for example, alkali, alkaline earth or ammonium salts can be prepared from the free hydroxy-carboxylic acids or from the hydroxy-carboxylic acids esterified or etherified at the phenol group.

*Example 3*

66 parts of 6-(6'-methoxy-naphthyl-1')-4-methyl-4-carbomethoxy-hexane-3-one are mixed with 1500 parts of ice-cold sulfuric acid of 80 percent strength and shaken at 0° C. until complete solution has occurred. The reaction starts immediately with formation of a red-brown coloration. After some hours the whole is poured onto ice and the precipitated reaction product taken up in ether. After evaporation, the ether solution which has been washed until neutral leaves behind a brownish oil which crystallizes (21 parts) when mixed with isopropylether. By recrystallizing it from alcohol there is obtained the pure 7-methoxy - 1 - hydroxy - 1 - ethyl - 2 - methyl - 2 - carbomethoxy -1:2:3:4- tetrahydrophenanthrene of melting point 127–128° C. and of the formula

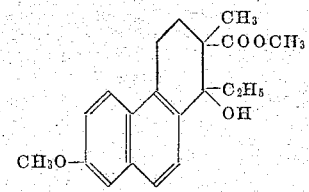

From the mother liquors a further crystal fraction (8.4 parts) can be isolated in the cold which when recrystallized repeatedly from alcohol melts at 152–153.5° C. and represents the epimeric 7-methoxy - 1 - hydroxy - 1 - ethyl - 2 - methyl - 2 - carbomethoxy - 1:2:3:4 - tetrahydrophenanthrene. From the last mother liquors the two isomeric 7 - methoxy - 1 - ethylidene - 2 methyl - 2 - carbomethoxy - 1:2:3:4 - tetrahydrophenanthrenes of melting points 117–118° C. or 134–135° C. can finally be obtained after evaporating, recrystallizing from methanol and chromatographing on aluminum oxide.

25 parts of a mixture of the two epimeric 7-methoxy - 1 - hydroxy - 1 - ethyl - 2 - methyl - 2 - carbomethoxy - 1:2:3:4 - tetrahydro-phenanthrenes are heated on the water-bath for 1½ hours with 0.5 part of iodine and 250 parts of chloroform. The reaction mixture is poured into water, the iodine is removed with thiosulfate solution, the solvent is dried and evaporated. The two isomeric 7 - methoxy - 1 - ethylidene - 2 - methyl - 2 - carbomethoxy - 1:2:3:4 - tetrahydrophenanthrenes of melting points 117–118° C. or 134–135° C. can be separated from the residue. The two unsaturated esters are thus formed in proportion 1:1. If the elimination of water is brought about with formic acid alone instead of with iodine in chloroform, there are obtained, after working up, 1/3 of the isomer of melting point 117–118° C. and 2/3 of the isomer of melting point 134–135° C. The latter can be converted into the former in about the following manner: 2.5 parts of the unsaturated ester of melting point 134–135° C. in 30 parts of chloroform are heated for 2 hours on the water-bath under reflux with 0.05 part of iodine. The product is then worked up as usual. Equal parts of the unsaturated esters of melting points 134–135° C. and 117–118° C. are obtained.

27 parts of a mixture of the two unsaturated esters of melting point 117–118° C. and 134–135° C. respectively, are introduced at 140° C. into a mixture of 53 parts of potassium hydroxide, 15 parts of water and 15 parts of alcohol. The temperature is allowed to rise to 170° C. The potassium salts of the two isomeric unsaturated acids are precipitated in solid form in practically quantitative yield. For the purpose of removing small quantities of starting material the aqueous solution of the potassium salts is shaken with ether and acidified. The two isomeric 7 - methoxy - 1 - ethylidene - 2 - methyl - 2 - carboxy - 1:2:3:4 - tetrahydrophenanthrenes can be purified by fractional crystallization from alcohol. In the pure state they have a melting point of 180–181° C. and 201–202° C., respectively. Both acids melt with decomposition.

15 parts of a mixture of these two unsaturated acids are dissolved in 700 parts of water and 20 parts of sodium hydroxide and hydrogenated with 20 parts of a nickel catalyst at 50 C. under atmospheric pressure. After the calculated quantity of hydrogen has been absorbed the hydrogenation comes to an end. The alkaline solution is then acidified and the 7 - methoxy - 1 - ethyl - 2 - methyl - 2 - carboxy - 1:2:3:4 - tetrahydrophenanthrenes obtained in the form of grains are suction-filtered and recrystallized from acetone. 12.7 parts of the physiologically active acid of melting point 224–226° C. and 1.3 parts of the isomeric acid of melting point 191–193° C. are obtained. On using not so large an excess of alkali hydroxide during the hydrogenation the yield of the physiologically active acid is lowered and more of the isomeric acid is obtained. When the hydrogenation is performed in neutral or acid solution practically only the isomeric acid is produced.

8.6 parts of the saturated methoxy acid of melting point 222–224° C. in a mixture of 32 parts of potassium hydroxide and 80 parts of methanol are heated for 7 hours in an autoclave to 210° C. After cooling, the mixture is poured into water, acidified and taken up in ether. For the purpose of decolorizing the ethereal solution, the whole is shaken with little saturated sodium bicarbonate solution. After evaporating the solvent there are obtained 8 parts of 7 - hydroxy - 1 - ethyl - 2 - methyl - 2 - carboxy - 1:2:3:4 - tetrahydrophenanthrene melting at 204–205° C. after recrystallization from acetic ester.

The same final product is also obtained by removing the hydroxyl group of the 7-methoxy-1-hydroxy-1-ethyl- 2 - methyl - 2 - carbomethoxy-1:2:3:4-tetrahydrophenanthrene at first directly by reduction, for example with hydriodic acid. This hydroxyl group, however, can also be converted, e. g. replaced by halogen, whereupon halogen hydride can be eliminated from the compound thus obtained, and the resulting double bond can subsequently be hydrogenated or the halogen can be removed from the halogen compound by reduction. For the purpose of saponifying the methoxy and/or carbomethoxy group the product is then treated with hydrolyzing agents, if necessary.

*Example 4*

4 parts of 5-(6'-methoxy-naphthyl-1')-3-carbethoxy-pentanone-2 of the formula

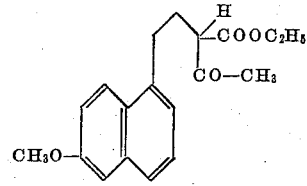

(obtained, for example, by the reaction of 1-(β-iodo-ethyl)-6-methoxy-naphthalene with acetoacetic acid ethylester) are shaken for 16 hours at 0° C. with 100 parts of sulfuric acid of 80 per cent. strength, whereby an orange-red solution is obtained. This is poured onto ice and the solid reaction product which has precipitated is separated in usual manner into acid and neutral portions. The acid fraction amounting to 3 parts represents the 7-methoxy-1-methyl-2-carboxy-3:4-dihydrophenanthrene of the formula

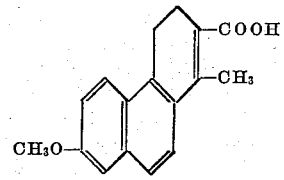

It is sparingly soluble in all organic solvents and melts at 238–240° C. with decomposition after recrystallization from acetone.

1 part of this unsaturated acid of melting point 238–240° C. is hydrogenated at 50° C. with 0.3 part of sodium hydroxide, 150 parts of water and 1 part of nickel catalyst. The calculated quantity of hydrogen is absorbed after 5 hours. The whole is suction-filtered to remove the catalyst and the hydrogenated acid is precipitated with mineral acid. After a single recrystallization from a mixture of acetone and methanol there is obtained 0.8 part of 7-methoxy-1-methyl-2-carboxy-1:2:3:4-tetrahydrophenanthrene of the formula

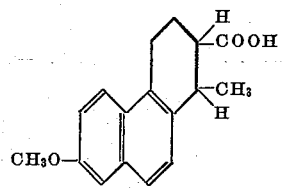

melting at 192–197° C. The melting point rises to 203–204° C. by further recrystallisation from methanol.

1 part of this compound is heated with 4 parts of pyridine hydrochloride for 3 hours to 170° C. for the purpose of splitting off the methoxy group. It is then poured into water and the reaction product is extracted with ether. The ethereal solution is washed with hydrochloric acid and water, dried and evaporated. There is thus obtained 0.8 part of 7-hydroxy-1-methyl-2- carboxy-1:2:3:4-tetrahydrophenanthrene of the formula

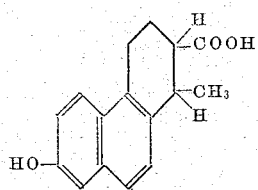

melting at 180–185° C. after recrystallization from ethyl acetate. Instead of with pyridine hydrochloride, splitting off of the methoxy group can also be brought about with mixture of glacial acetic acid and hydrochloric acid or glacial acetic acid and hydrobromic acid.

*Example 5*

7.7 parts of 5-(6'-methoxy-naphthyl-1')-3-methyl-3-carbethoxy-pentanone-2 in 20 parts of benzene are run at 0° C. into a Grignard solution prepared from 3.3 parts of ethyl-bromide and 0.81 part of magnesium in 20 parts of ether. A change of color occurs immediately. The clear, greenish colored solution is allowed to stand for 14 hours at room temperature and then boiled under reflux for 1½ hours. After cooling the mixture is decomposed with ice and ammonium chloride. After evaporating, the washed and dried ethereal solution leaves behind 8.1 parts of a colorless viscous oil. This decomposes when distilled in a high vacuo and is therefore worked up without further purification. It represents the 6-(6'-methoxy-naphthyl-1')-3-hydroxy-3:4-dimethyl-4-carbethoxy-hexane of the formula

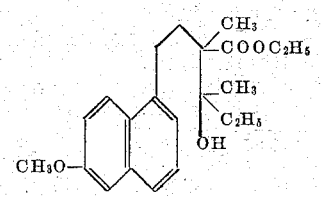

A solution of 3 parts of this crude compound in 10 parts of ether is introduced in drops within 1½ hours at −3° C., while stirring, into 30 parts of sulfuric acid of 95 per cent. strength. The dark red colored solution is subsequently allowed to stand for 3 hours at −10° C. It is then poured onto ice and the reaction product is taken up in ether. For the purpose of saponifying the esterified carboxyl group, the ether residue is heated with caustic potash solution for a short time to 170° C., as indicated in Example 3. The 7-methoxy-1-ethyl-1:2-dimethyl - 2 - carboxy - 1:2:3:4-tetrahydrophenanthrene thus obtained of the formula

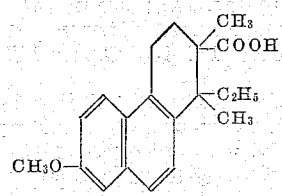

melts, after recrystallisation from methanol, at 185–188° C. without decomposition. It can be converted into the 7-hydroxy-1-ethyl-1:2-dimethyl-2-carboxy - tetrahydrophenanthrene, for example, by heating with pyridine hydrochloride.

As starting materials there can also be used other 5-(6'-alkoxy-naphthyl-1')-3-alkyl-3-carbalkoxy-pentanones-2 or their side chain homologues, as well as other agents capable of converting the group >C=O in the side chain into the group

wherein R represents, for example, an alkyl, aralkyl or aryl group.

In a manner analogous to that described in the foregoing examples, there can generally be produced the compounds of the formula

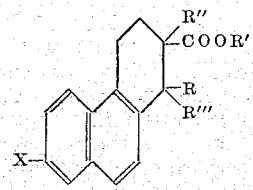

wherein R, R', R'', R''' and X have for example the signification indicated in the following table:

| | |
|---|---|
| R | $-CH_3$, $-CH_2CH_3$, $-CH_2CH=CH_2$, $-CH_2CH_2CH_3$, $-CH(CH_3)_2$, $-CH_2CH_2CH_2CH_3$, $-CH_2CH(CH_3)_2$, $-CH(CH_2CH_3)CH_3$, $-C(CH_3)_3$, $-CH_2CH_2CH_2CH_2CH_3$, $-CH(CH_2CH_2CH_3)CH_3$, $-CH_2-C_6H_5$, $-CH_2CH_2-C_6H_4-OH$, $-CH_2CH_2OH$. |
| R' | H, $-CH_3$, $-CH_2CH_3$, $-CH_2CH_2CH_3$ |
| R'' | H, $-CH_3$, $-CH_2CH_3$, $-CH_2CH=CH_2$, $-CH_2CH_2CH_3$. |
| R''' | H, $-CH=CH_2$, $-C\equiv CH$, further analogously to R. |
| X | $-OH$, $-OCH_3$, $-OC_2H_5$, $-OCH_2-C_6H_5$, $-OCOCH_3$, $-OCOCH_2CH_3$, $-OCO-C_6H_5$, $-OCOC_{17}H_{35}$. |

Apart from the above described compounds, the following compounds can inter alia also be produced:

7 - hydroxy - 1 - methyl - 2 - carboxy - 2 - ethyl - 1:2:3:4 - tetrahydrophenanthrene,
7 - hydroxy - 1 - methyl - 2 - carboxy - 2 - propyl - 1:2:3:4 - tetrahydrophenanthrene,
7 - hydroxy - 1 - methyl - 2 - carboxy - 2 - isopropyl - 1:2:3:4 - tetrahydrophenanthrene,
7 - hydroxy - 1 - methyl - 2 - carboxy - 2 - butyl - 1:2:3:4 - tetrahydrophenanthrene,
7 - hydroxy - 1 - methyl - 2 - carboxy - 2 - isobutyl - 1:2:3:4 - tetrahydrophenanthrene,
7 - hydroxy - 1 - methyl - 2 - carboxy - 2 - benzyl - 1:2:3:4 - tetrahydrophenanthrene,
7 - hydroxy - 1 - propyl - 2 - carboxy - 2 - methyl - 1:2:3:4 - tetrahydrophenanthrene,
7 - hydroxy - 1 - isopropyl - 2 - carboxy - 2 - methyl - 1:2:3:4 - tetrahydrophenanthrene,
7 - hydroxy - 1 - butyl - 2 - carboxy - 2 - methyl - 1:2:3:4 - tetrahydrophenanthrene,
7 - hydroxy - 1 - isobutyl - 2 - carboxy - 2 - methyl - 1:2:3:4 - tetrahydrophenanthrene,
7 - hydroxy - 1 - valeryl - 2 - carboxy - 2 - methyl - 1:2:3:4 - tetrahydrophenanthrene,
7 - hydroxy - 1 - isovaleryl - 2 - carboxy - 2 - methyl - 1:2:3:4 - tetrahydrophenanthrene,
7 - hydroxy - 1 - benzyl - 2 - carboxy - 2 - methyl - 1:2:3:4 - tetrahydrophenanthrene,
7 - hydroxy - 1 - phenylethyl - 2 - carboxy - 2 - methyl - 1:2:3:4 - tetrahydrophenanthrene,
7 - hydroxy - 1 - β - hydroxyethyl - 2 - carboxy - 2 - methyl - 1:2:3:4 - tetrahydrophenanthrene.
7 - hydroxy - 1 - ethyl - 2 - carboxy - 1:2:3:4 - tetrahydrophenanthrene,
7 - hydroxy - 1 - propyl - 2 - carboxy - 1:2:3:4 - tetrahydrophenanthrene,
7 - hydroxy - 1 - butyl - 2 - carboxy - 1:2:3:4 - tetrahydrophenanthrene,
7 - hydroxy - 1:1 - dimethyl - 2 - carboxy - 2 - methyl - 1:2:3:4 - tetrahydrophenanthrene,
7 - hydroxy - 1:1 - diethyl - 2 - carboxy - 2 - methyl - 1:2:3:4 - tetrahydrophenanthrene,
7 - hydroxy - 1 - methyl - 1 - allyl - 2 - carboxy - 2 - methyl - 1:2:3:4 - tetrahydrophenanthrene,
7 - hydroxy - 1 - methyl - 1 - allyl - 2 - carboxy - 2 - allyl - 1:2:3:4 - tetrahydrophenanthrene,
7 - hydroxy - 1 - methyl - 1 - allyl - 2 - carboxy - 2 - ethyl - 1:2:3:4 - tetrahydrophenanthrene,
7 - hydroxy - 1 - methyl - 1 - para - hydroxy - phenyl - 2 - carboxy - 2 - methyl - 1:2:3:4 - tetrahydrophenanthrene,
7 - benzoyloxy - 1 - ethyl - 2 - carbomethoxy - 2 - methyl - 1:2:3:4 - tetrahydrophenanthrene,
7 - benzoyloxy - 1 - ethyl - 2 - carboxy - 2 - methyl - 1:2:3:4 - tetrahydrophenanthrene,
7 - propionyloxy - 1 - ethyl - 2 - carbomethoxy - 2 - methyl - 1:2:3:4 - tetrahydrophenanthrene,
7 - propionyloxy - 1 - ethyl - 2 - carboxy - 2 - methyl - 1:2:3:4 - tetrahydrophenanthrene,
7 - benzoyloxy - 1:1 - diethyl - 2 - carbomethoxy - 2 - methyl - 1:2:3:4 - tetrahydrophenanthrene,
7 - benzoyloxy - 1:1 - diethyl - 2 - carboxy - 2 - ethyl - 1:2:3:4 - tetrahydrophenanthrene,
7 - hydroxy - 1 - methyl - 1 - allyl - 2 - carbomethoxy - 2 - methyl - 1:2:3:4 - tetrahydrophenanthrene,
7 - methoxy - 1 - propyl - 2 - carboxy - 2 - methyl - 1:2:3:4 - tetrahydrophenanthrene,
7-methoxy-1-ethyl-2-carboxy-1:2:3:4-tetrahydrophenanthrene,
7 - ethoxy - 1:1 - diethyl - 2 - carboxy - 2 - ethyl - 1:2:3:4 - tetrahydrophenanthrene,
7 - methoxy - 1 - methyl - 2 - carbomethoxy - 2 - ethyl - 1:2:3:4 - tetrahydrophenanthrene,
7 - methoxy - 1:1 - dimethyl - 2 - carbomethoxy - 2 - methyl - 1:2:3:4 - tetrahydrophenanthrene.

What we claim is:

1. A process for the manufacture of an hydroxyhydrophenanthrene, which comprises treating a compound of the formula

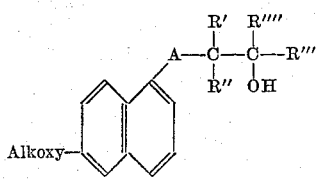

wherein A represents an unsubstituted ethylene group, R' and R''' represent members selected from the group consisting of unsubstituted saturated and unsaturated lower aliphatic hydrocarbon radicals, R'' represents an esterified carboxyl group and R'''' represents a member of the group consisting of a hydrogen atom and unsubstituted saturated and unsaturated aliphatic hydrocarbon radicals, with an inorganic acid.

2. A process for the manufacture of an hydroxy-hydrophenanthrene, which comprises treating a compound of the formula

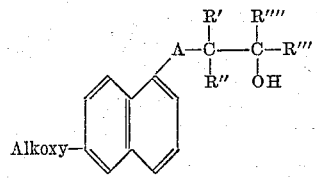

where A represents an unsubstituted ethylene group, R', R''' and R'''' represent unsubstituted lower alkyl radicals, and R'' represents an esterified carboxylic acid group, with concentrated sulfuric acid.

3. A process for the manufacture of any hydroxy-hydrophenanthrene, which comprises treating a compound of the formula

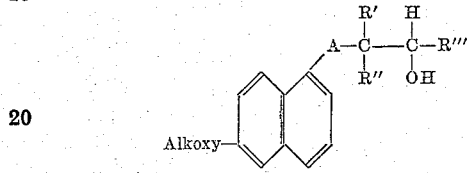

wherein A represents an unsustituted ethylene group, R' and R''' represent unsubstituted lower alkyl radicals and R'' represents an esterified carboxyl group, with concentrated sulfuric acid.

4. Process for the manufacture of an hydroxyhydrophenanthrene which comprises treating 6-(6'-methoxy-naphthyl-1')-3,4-dimethyl-4-carbethoxy-hexane-3-ol with concentrated sulfuric acid.

5. A compound of the formula

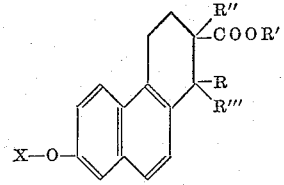

wherein R, R'' and R''' each represents a member selected from the group consisting of unsubstituted saturated and unsaturated lower aliphatic hydrocarbon radicals, R' is a member selected from the group consisting of hydrogen and lower alkyl, and X is a member selected from the group consisting of hydrogen, lower alkyl and carboxylic acid radicals, the —O—X grouping in the latter case being an ester grouping.

6. The 7-methoxy-1-ethyl-1:2-dimethyl-2-carboxy-1:2:3:4-tetrahydrophenanthrene of the formula

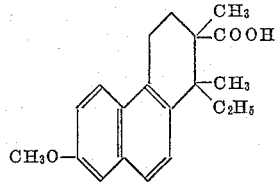

melting at about 185–188° C.

KARL MIESCHER.
GEORG ANNER.

REFERENCES CITED

The following references are of record in the file of this patent:

Bachmann et al. (I), "J. A. C. S.," vol. 63 (1941), pages 595–598; 2592–2598.
Bachmann et al. (II), "J. A. C. S.," vol. 64 (1942), pages 974–981.
Dane et al., "Annalen der Chemie," vol. 552 (1942), pages 113–125.
Bachmann et al. (III), "J. A. C. S.," vol. 65 (1943), pages 2314–2318.
Breitner et al., "Chemisches Zentralblatt" (1943), I, pages 2688–2689.

Certificate of Correction

Patent No. 2,459,949.                                          January 25, 1949.

KARL MIESCHER ET AL.

It is hereby certified that errors appear in the printed specification of the above numbered patent requiring correction as follows:

Column 1, line 29, for the name "Bachman" read *Bachmann*; columns 3 and 4, bottom of the page, for that portion of the middle formula reading

column 8, lines 56 and 57, for "2 meethyl" read *2-methyl*; column 14, line 13, for the word "any" read *an*; line 23, for "unsustituted" read *unsubstituted*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*